Nov. 7, 1950 A. C. CLASEN ET AL 2,528,861
FISHING LURE
Filed Aug. 27, 1946 2 Sheets-Sheet 1

ARTHUR C. CLASEN,
HUGH J. MILLGARD &
THEODORE A. PHELPS
INVENTORS

BY *Smith & Tuck*

ATTORNEYS

Nov. 7, 1950 A. C. CLASEN ET AL 2,528,861
FISHING LURE
Filed Aug. 27, 1946 2 Sheets-Sheet 2
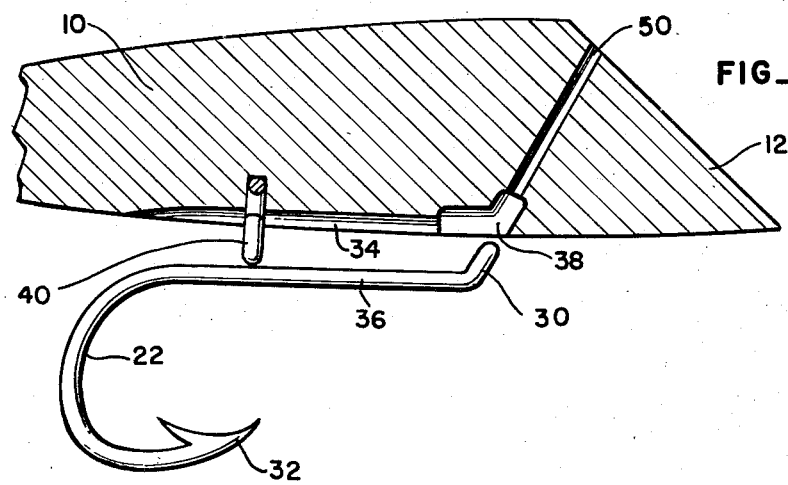
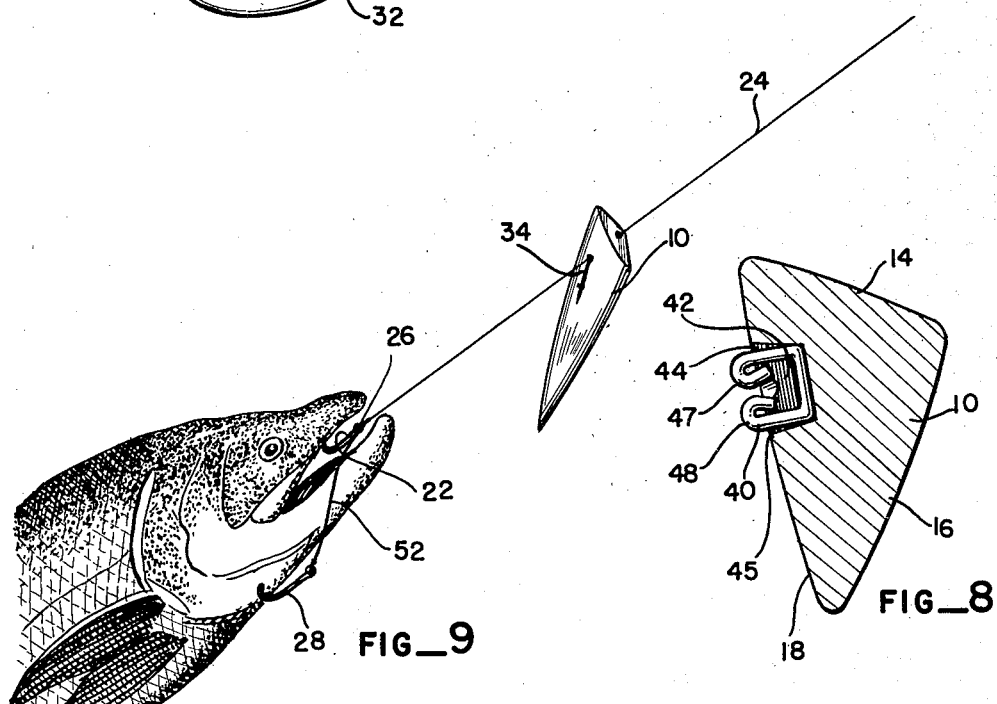
ARTHUR C. CLASEN,
HUGH J. MILLGARD &
THEODORE A. PHELPS
INVENTORS
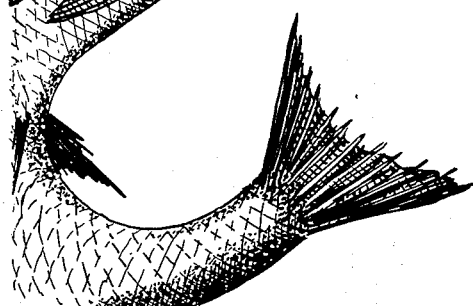
ATTORNEYS Patented Nov. 7, 1950

2,528,861

UNITED STATES PATENT OFFICE 2,528,861

FISHING LURE

Arthur C. Clasen, Kansas City, Kans., and Hugh J. Millgard, Spokane, and Theodore A. Phelps, Seattle, Wash.

Application August 27, 1946, Serial No. 693,360

1 Claim. (Cl. 43—42.05)

This invention relates to the art of artificial fish lures and, more particularly, to a lure which, because of its structure, may be termed a free hook fishing lure.

In trolling or casting for the heavier fish, such as are taken particularly in salt water fishing, it is desirable to provide a lure which will be a reasonable representation of the type of food the fish sought are accustomed to eating. Following this principle, we have provided in our present fishing lure a body proportioned and colored to represent a piece of fish flesh as though it were cut or torn from the body of a fish.

In order to attract fish so that they will strike the lure, the body of our fishing lure has been so proportioned that it has its mass at the forward or towing end, and this end is cut at an angle so that when the towing line is in effect secured near the rear margin of the forward water-impinging face, the fishing lure will take on the gyrations or movements which characterize fishing plugs that have proved very successful in the past for taking a wide variety of fish. Following out the plan of producing a natural action in the water, the lure body is then made of arcuate sides so that they terminate in a rear point. This has been found quite essential in a plug of this order, due to the fact that fish themselves are very excellent representations of streamlined bodies.

To carry out the illusion of a fish or part of a fish, a hook is provided with a rearward attaching leader, so that it will tend to gyrate in a circular path just beyond the rear point of the lure, and in this way, due to the brightness of the hook, a simulation of a thin, almost transparent fish tail is provided.

In fishing with plugs of the type normally made of wood and having hooks secured to them, considerable difficulty is experienced with the fish freeing themselves after they have hit the lure. This is made possible, to a large degree, due to the fact that the fishing line is secured to one end of the plug and the hooks are secured on the sides, so that an angular strain is placed on the plug. This gives an active, strong fish quite an advantage, in that he may use this natural weakness of the plug to help him tear or shake himself loose from the bait. Recognizing this as a serious deficiency of fishing plugs in general when used in the taking of large, powerful fish, we have provided means whereby, after the fish has struck the lure, the body of the lure is freed of the hooks, and is arranged so that it may move away from the hook up the line or leader, so as to be entirely out of the fish's reach, and all that is left with the fish are the hooks with which he is engaged. This arrangement has been found to be most effective in holding fish after they have struck.

The principal object of our invention, therefore, is to provide a fishing lure which will simulate the natural food of the fish, and which is so constructed that after the fish has hit the lure he will be securely engaged and the body of the lure will be released so that it will be out of the range of the fish's threshing about and not present an aid to assist him in freeing himself.

A further object of our invention is to provide a fish lure having a body of such conformation that an acceptable bait can be provided for fishing.

A further object of our invention is to provide a fishing lure of very simple structure so that it can be made in quantities for sale at a low price, thus permitting a fisherman to have at reasonable expense a large number of plugs which can be colored or made in a wide range of sizes so as to present a bait that, under the particular condtions of fishing, will be most acceptable to the fish.

A further object of our invention is to provide a fishing lure in which the hooks and towing leader are readily attached to or disconnected from the lure, to the end that changes in the body form may be quickly and easily made.

A further object of our invention is to provide a fishing lure in which one or more hooks may be frictionally secured to the body of the lure, yet held in a more or less rigid position, thus insuring adequate penetration when the fish strikes.

A further object of our invention is to provide a fish lure in which frictionally held hooks may be quickly and easily released by the fish in his act of hitting the lure, to the end that the body of the lure may be released and moved out of the fish's area of disturbance.

A further object of our invention is to provide recesses in the body of our lure so that a particular style of hook may be quite firmly held and presented to the fish in the most effective manner.

Further objects, advantages and capabilities will be apparent from the description and the disclosure in the drawings, or may be comprehended or are inherent in this device.

In the drawings:

Figure 1 is a side elevational view of our fishing lure as it is normally towed or retrieved in fishing;

Figure 2 is a bottom plan view of the lure shown in Figure 1;

Figure 3 is a top plan view of our lure;

Figure 4 is a front elevational view of our lure;

Figure 5 is a bottom plan view of a modified form of our lure;

Figure 6 is a view of our lure, illustrating in dashed and broken lines the range of gyrations achieved by our particular conformation and hook arrangement;

Figure 7 is an enlarged sectional view taken in the vertical plane along lines 7—7 of Figure 2;

Figure 8 is a cross-sectional view taken substantially along the line 8—8 of Figure 2; and Figure 9 is a pictorial representation of a fish engaged on the hooks of our lure, with the body of the lure displaced from the hooks and resting upon the line beyond the reach of the fish.

In the drawings, throughout which like reference characters indicate like parts, the numeral 10 designates generally the body of our lure. This may be made of any suitable material. However, in order to achieve the action desired as the lure is fished, it has been found that if the lure is made of plastic material it has sufficient specific gravity to be most satisfactory.

The general conformation of our lure is to represent a bait as it would be formed if it were cut out of the side of a herring or mullet, or other small fish, normally used as bait for game fish. In general, the lure may be considered to have a head or base 12, and three arcuate, triangular sides, as 14, 16, and 18. The side 14 is of least area and represents the upper surface that would be the result of inserting a knife just below the back of the fish and making a slightly curved cut. Side 16 would represent the skin of the fish, whereas side 18, which is of greatest area of the three sides, would again represent a cut surface. All three of the sides 14, 16 and 18 meet at a common vertex or point 20.

Face 12 we prefer to make with a diagonal cut in order that an oscillating swimming action will be achieved as the bait is trolled or retrieved through the water. This cut is believed to be quite fully illustrated in the various views of the drawings. We normally prefer to attach our hooks to the lure in the manner illustrated, wherein a leading hook as 22 is securely attached to the fishing line or leader 24, the same being knotted at 26. Attached to a separate short piece of leader or line, or preferably a continuation of line 24, is the rear or trailing hook 28 which is disposed so that the point of the hook is well in the rear of tip 20. This is an essential relationship in order to provide the tail simulation after the showing of Figure 6.

Hook 22 is provided with a reverse turn eye, probably best illustrated in Figure 7, in which the eye 30 is turned in the opposite direction from the point of the hook 32.

Reference is now made to Figure 7 wherein enlarged sectional view are shown the recess 34 to accommodate the shank portion 36 of hook 22 and also the enlarged recess portion 38 which is formed in order to seat the inturned eye 30 and the knotting of the line or leader which normally would occur just down the shank from the out-turned eye 30. In order to hold hook 22 in the outstanding relationship shown in Figure 1, it requires the combined coaction of the out-turned eye 30 and recess 38, recess 34 and the resilient clip member 40. This clip member is best illustrated in Figure 8, wherein a molded in recess 42 is provided within the body 10 of the lure and the U-shaped clip 40 is molded or pressed therein. Clearance is provided at 44 and 45 so that the reverse or the return bent portions 47 and 48, which should normally be spaced apart less than the thickness of shank 36 of hook 22, may be sprung outwardly and thus provide a secure frictional engagement with the hook shank. It has been found quite essential that adequate means be provided for holding the hook securely in position and requiring a considerable force for its dislodgement. When this arrangement is provided, the hook 22 will be held in an outwardly extending position and the fish in striking will meet considerable resistance due to the mass of the lure body so that the hook will be securely engaged. Then as the fish tends to thresh about, the hook will then be dislodged.

Starting near the apex of surface 12 of the lure, and opposite from the long side 18 thereof, is a line-admitting opening 50. As shown in Figure 7, this opening passes down through the base of the lure into the enlarged recess 38 so that the fishing line or leader tied to hook 22 can pass up through this opening and when the hook is embedded and held by clip 40 in its position of attack, the hook, line and lure are in effect one unit. However, as soon as the fish has struck with force enough to dislodge hook 22, the body 10 of the lure is then free and normally will be propelled up along line 24, after the showing of Figure 9.

During the time that the lure is being fished, due to the arcuate surfaces 14, 16, 18, in co-action with the beveled base or surface 12, the lure body tends to gyrate or oscillate around the axis of line 24, as shown in Figure 6 and while this action is taking place, it has been found that the rear or trailing hook 28 will swing first from one side to the other and create a pattern which is represented in Figure 6. The flashing of hook 28 tends to create an illusion of movement, and at times to create an illusion of the semi-transparent tail structure of the average small fish, so that a very life-like presentation of the lure is made which has proved to be highly successful. After a fish has struck, normally becoming engaged with hook 22, it has been found that due to the relatively short coupling line or leader 52, joining hooks 22 and 28, that almost invariably hook 28 will eventually engage the fish somewhat after the showing of Figure 9 and tends to greatly increase the security of hooking, in many instances it being found that even though hook 22, which normally is engaged in the fish's mouth, should become dislodged through the biting or jumping action of the caught fish, that the trailing hook 28, finding lodgment on the outside of the fish's head in the normal bony structure, provides a very secure hooking of the fish.

It will be clearly apparent, it is believed, from the above description and disclosure in the drawings that the invention comprehends a novel construction of a fishing lure which is simple and positive in operation and very flexible in its use.

Having thus described our invention, we claim:

A fishing lure consisting of a body having a substantially pyramidal form adapted to be towed with its base end forward, said base end which is formed as a single flat plane being disposed angularly with respect to adjacent surfaces of the body to form a water impinging surface; said body being formed of three longitudinally arcuate triangular surfaces one of which has a greater area than the others, and is disposed to form the bottom of the lure; said lure having a hole passing therethrough from the base end to the larger side and directed rearwardly; a leader adapted to freely pass through said hole and have secured to it, in spaced apart relationship, a plurality of fish hooks having shanks and eyes; said large side having a recess formed therein adapted to receive the shank and eye of one of said hooks and resilient means adapted to frictionally secure said one hook in said recess.

ARTHUR C. CLASEN.
HUGH J. MILLGARD.
THEODORE A. PHELPS.

REFERENCES CITED

The following references are of record in the file of this patent:

UNITED STATES PATENTS

| Number | Name | Date |
| --- | --- | --- |
| 1,101,223 | Welles | June 23, 1914 |
| 1,791,316 | Jordan | Feb. 3, 1931 |
| 1,900,832 | Martin | Mar. 7, 1933 |
| 2,159,606 | Scogland et al. | May 23, 1939 |
| 2,183,059 | Bacon | Dec. 12, 1939 |
| 2,225,676 | White | Dec. 24, 1940 |
| 2,389,883 | Worden | Nov. 27, 1945 |